US005129133A

United States Patent [19]

Reesor

[11] Patent Number: 5,129,133

[45] Date of Patent: Jul. 14, 1992

[54] COUPLER DRAFT KEY PULLER

[76] Inventor: David W. Reesor, 199 Range Crescent, NW., Calgary, Alberta, Canada, T3G 1P5

[21] Appl. No.: 688,443

[22] Filed: Apr. 22, 1991

[30] Foreign Application Priority Data

Nov. 5, 1990 [CA] Canada .............................. 2029335

[51] Int. Cl.$^5$ .............................. B23B 19/02

[52] U.S. Cl. .............................. 29/252

[58] Field of Search .............................. 29/252, 263-265, 29/427, 237, 239

[56] References Cited

U.S. PATENT DOCUMENTS 2,507,003 5/1950 Gagne .............................. 29/252
3,744,116 7/1973 Peterson .............................. 29/252
3,797,097 3/1974 Peterson .............................. 29/252

FOREIGN PATENT DOCUMENTS 22682 7/1907 United Kingdom .............................. 29/265

*Primary Examiner*—Robert C. Watson
*Attorney, Agent, or Firm*—George A. Seaby

[57] ABSTRACT

Removing the draft key from a so-called E-type railway car coupler can be a difficult job. A relatively simple tool for removing a key of the type including a flanged head includes a pair of parallel hydraulic cylinders, a yoke interconnecting one end of the cylinders, piston rods extending out of the other end of the cylinders, a sleeve in the yoke parallel to the cylinders, an elongated shaft for removable mounting in the sleeve, a latch for retaining the shaft in the sleeve, and a socket in the outer free end of the shaft for receiving the head of the key, whereby with the shaft in the sleeve and connected to a key, extension of the piston rods against the coupler pocket pushes the cylinders, and consequently the sleeve and shaft outwardly to pull the key from the coupler.

4 Claims, 2 Drawing Sheets

COUPLER DRAFT KEY PULLER

BACKGROUND OF THE INVENTION

1. FIELD OF THE INVENTION

This invention relates to a pulling device, and in particular to a device for removing a key from a railway car coupler.

2. DISCUSSION OF THE PRIOR ART

The removal of so-called E-type coupler draft keys used on railway cars is very difficult, usually involving the use of one key for driving a second key out of the latched position. The result is often that the first key becomes lodged and is difficult to remove. A search for a solution to the above problem led to the present invention, the object of which is to provide a relatively simple device for removing a coupler draft key from a railway car coupler which is easy to connect to the key.

Fluid actuated cylinders previously have been used in pulling devices. Examples of such devices are described in U.S. Pat. Nos. 2,452,457, issued to G. W. Gary et al on Oct. 26, 1948; 2,570,914, issued to C. N. Buck on Oct. 9, 1951; 2,735,649, issued to S. A. Swallert on Feb. 21, 1956; 2,874,933, issued to J. E. Feucht on Feb. 24, 1959, and 3,066,913, issued to A. E. Leeson on Dec. 4, 1962. To applicant's knowledge, the above listed patents represent the most relevant prior art. While some of the patented devices have features in common with the invention described herein, none of them offers the elegantly simple solution to the problem solved by the present invention.

GENERAL DESCRIPTION OF THE INVENTION

Accordingly, the present invention relates to a device for removing a draft key of the type including a shank and a head from a railway car coupler comprising a pair of fluid actuated cylinder means; yoke means interconnecting one end of said cylinder means for maintaining the cylinder means in permanent, parallel, spaced apart relationship; piston rod means extending outwardly from the other end of said cylinder means; sleeve means in said yoke means; elongated shaft means for removable mounting in said sleeve means; latch means for retaining said shaft means in said sleeve means; and socket means in the outer free end of said shaft means for receiving the head of a key, whereby, with the shaft means in said sleeve means and connected to a key, extension of the piston rod means against the coupler causes outward movement of said cylinder means, sleeve means and shaft means to pull the key from the coupler.

BRIEF DESCRIPTION OF THE DRAWINGS

The invention will be described in greater detail with reference to the accompanying drawings, which illustrate a preferred embodiment of the present invention, and wherein.

DESCRIPTION OF PREFERRED EMBODIMENT

Figure 1:
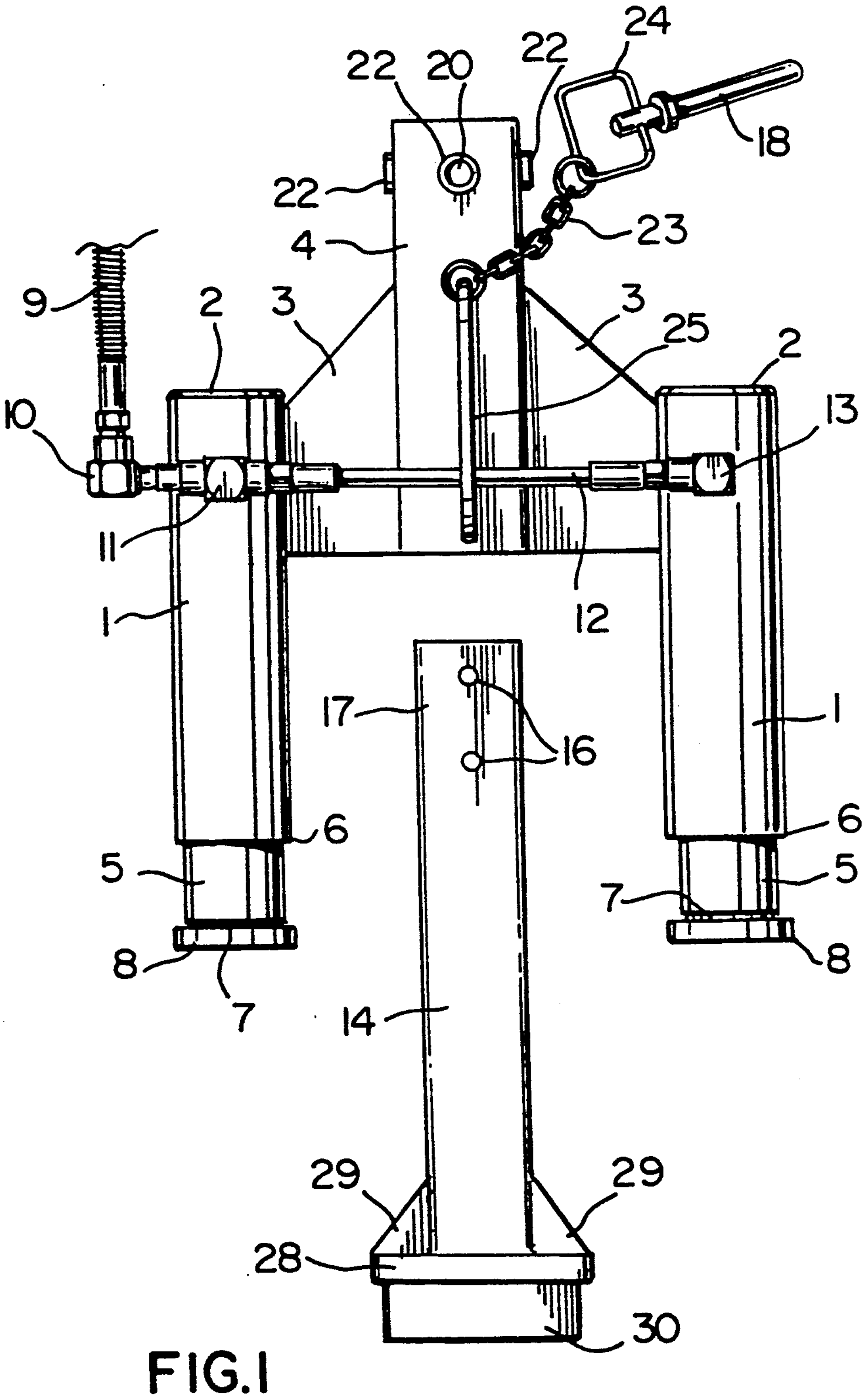
FIG. 1 is an exploded, plan view of a pulling device in the present invention.

With reference to FIG. 1, the pulling device of the present invention includes a pair of sleeves or tubes 1 each having one closed end 2. The closed ends 2 of the tubes 1 are interconnected by generally triangular plates 3 which are welded to the tube, and to an elongated, square cross section sleeve 4. Plates 3 are provided on the top and bottom of the tubes 2 and the sleeve 4, i.e. top and bottom plates 3 are provided on both sides of the sleeve 4. The plates 3 and the sleeve 4 define a yoke between the closed ends 2 of the tubes 1, with the sleeve 4 parallel to and one-half the distance between the tubes 1. A hydraulic cylinder 5 is mounted in each tube 1, extending out of the open end 6 thereof. A piston rod or plunger 7 extends out of each cylinder 5. A disc or saddle 8 is mounted on the outer end of the rod 7 for defining a large bearing surface. Hydraulic fluid is fed into and discharged from the cylinders 5 via a tube 9, an elbow 10, a T-coupler 11, a tube 12 and an elbow 13.

The sleeve 4 which extends beyond the closed ends 2 of the tubes 1 is intended to receive a square cross section shaft 14. For such purpose a pair of holes 16 extend through the shaft 14 near one end 17 thereof for receiving a pin 18. A washer 19 is mounted on the pin near the top end thereof for limiting movement of the pin into aligned holes 20 (one shown) in the top and bottom of the sleeve 4 when the sleeve holes 20 are aligned with one of the holes 16. A pair of holes with short sleeves 22 extending outwardly therefrom are also provided in the sides of the sleeve 4, so that the shaft can be rotated 90 and still slid into and connected to the sleeve 4. A chain 23 is connected to a loop 24 in the outer end of the pin 18 for connecting the latter to a generally C-shaped handle 25 on the front centre of the sleeve 4. Thus, one end of the pin 18 is permanently connected to the handle 25, and the other end thereof defines a portion of a latch for releasably engaging the shaft 14.

Figure 3:
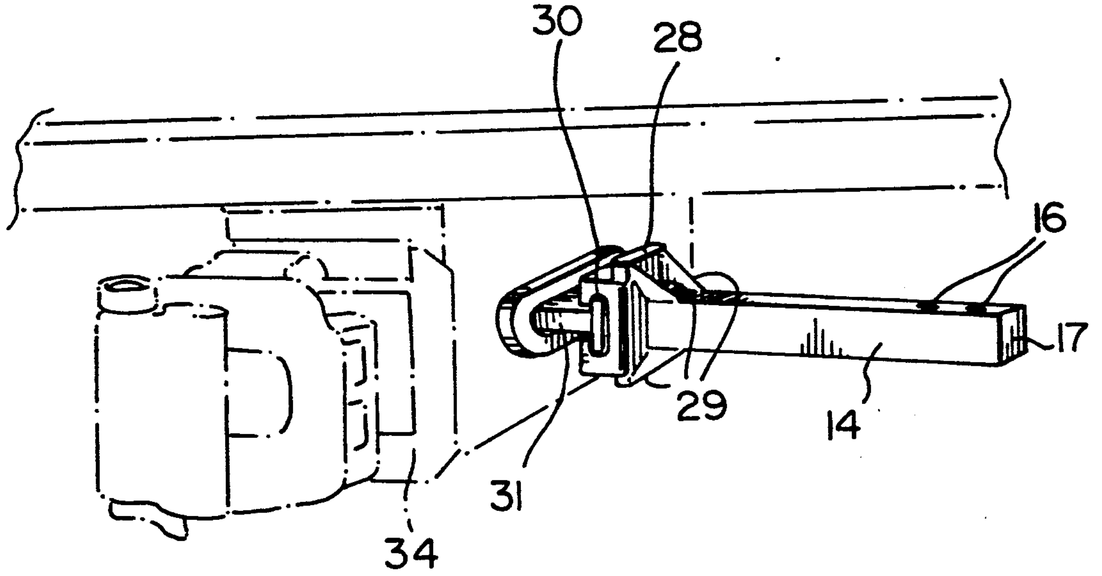
FIG. 3 a schematic, perspective view of a railway car coupler with the shaft of FIG. 2 connected thereto.
Figure 4:
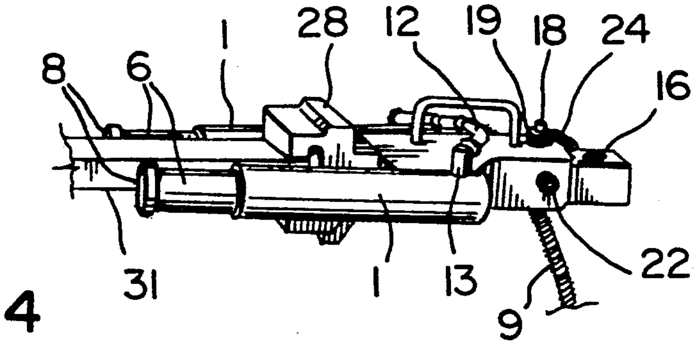
FIG. 4 is a perspective view of the device of FIG. 1 during a draft key removal operation.
Figure 2:
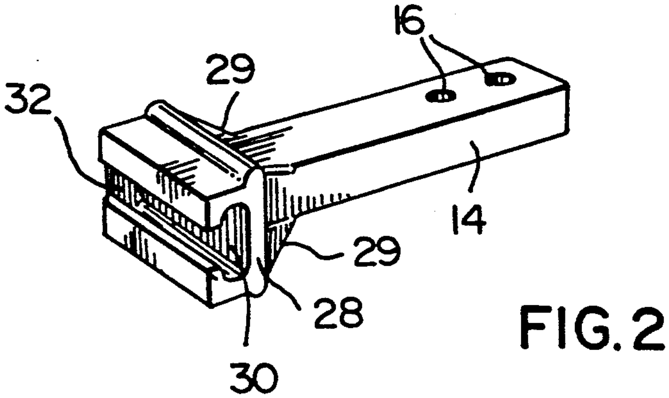
FIG. 2 is a perspective view of a shaft used in the device of FIG. 1.

A square plate 28 is mounted on the outer end of the shaft 14 with reinforcing gussets 29 extending from the corners thereof to the corners of the shaft 14. The plate 28 defines the inner end of a C-shaped socket 30 for receiving the flanged outer end (not shown) of a coupler key 31 (FIGS. 3 and 4). A plate 32 (FIG. 2) is provided on one end of the socket 30 for limiting movement of the key into the socket.

In use, with the shaft 14 separated from the remainder of the device, the socket 30 is placed on the outer free end of a key 31 (FIG. 3). The sleeve 4 is slid onto the shaft 14 until one set of holes 16 and 20 are aligned. The pin 18 is inserted into the aligned holes to couple the shaft 14 to the sleeve 4. Hydraulic fluid is introduced into the cylinders 5 to extend the piston rods 7. Actually the rods 7 remain stationary in contact with the railway car coupler 34 (FIG. 3), while the cylinders 5 and the sleeve 4 move outwardly. Because, the key 31, the shaft 14 and the sleeve 4 are interconnected, the key 31 moves outwardly with the shaft and the sleeve.

Thus, the key pulling operation is quick and easy. The device of the present invention is simple, lightweight and inexpensive to manufacture. The use of easily separated and re-connected elements facilitates the key pulling operation. Moreover,it is not necessary to manipulate a heavy piece of equipment into position.

I claim:

1. A device for removing a draft key of the type including a shank and a head from a railway car coupler comprising a pair of fluid actuated cylinder means; yoke means interconnecting one end of said cylinder means for maintaining the cylinder means in permanent, parallel spaced apart relationship; piston rod means extending outwardly from the other end of said cylinder means; sleeve means in said yoke means; elongated shaft means for removable mounting in said sleeve means; latch means for retaining said shaft means in said sleeve means; socket means in the outer free end of said shaft means for receiving the head of a key; and stop means on said socket means for limiting movement of a key into said socket means, whereby, with the shaft means in said sleeve means and connected to key, extension of the piston rod means against the coupler causes outward movement of said cylinder means, sleeve means and shaft means to pull the key from the coupler.

2. A device according to claim 1, wherein said latch means includes a first opening in said shaft means; a second opening in said sleeve means; and pin means for insertion into said first and second openings.

3. A device according to claim 1, wherein said yoke means includes a plate extending between said one end of the cylinder means; and said sleeve means includes a square cross section tube located centrally in said plate between the cylinder means.

4. A device for removing a draft key of the type including a shank and a head from a railway car coupler comprising a pair of tubes; each having one closed end and one open end; a pair of fluid actuated cylinders carried by said tube means; a yoke interconnecting the closed ends of said tubes for maintaining the cylinders in permanent, parallel, spaced apart relationship, said yoke including a pair of plates connected to each tube; a piston rod extending outwardly from the other end of each cylinder; a square cross section sleeve in said yoke between and 2 to said tubes and cylinders; and elongated shaft for removable mounting in the sleeve, a latch for retaining the shaft in the sleeve so that the shaft extends between the piston rods; a socket in the outer free end of the shaft for receiving the head of a key; and a stop in said socket for limiting movement of a key into the socket, whereby, with the shaft in said sleeve and connected to a key, extension of the piston rods against the coupler causes outward movement of the tubes, the cylinders, the sleeve and the shaft to pull the key from the coupler.

* * * * *